United States Patent [19]

Hussong

[11] Patent Number: 5,800,875
[45] Date of Patent: Sep. 1, 1998

[54] MINERAL FIBER LOG PROCESSING

[75] Inventor: Dudley D. Hussong, Lakefield, Minn.

[73] Assignee: Hussong Manufacturing Co., Inc., Lakefield, Minn.

[21] Appl. No.: 569,483

[22] Filed: Dec. 8, 1995

[51] Int. Cl.⁶ .................. B05D 1/18; B29C 33/42
[52] U.S. Cl. .......... 427/430.1; 156/177; 156/212; 156/214; 156/297; 264/40.3; 264/87; 264/129; 264/220; 264/336; 264/337
[58] Field of Search ............ 264/87, 220, 337, 264/129, 133, 40.1, 40.3, 336; 156/177, 212, 214, 297; 427/430.1

[56] References Cited

U.S. PATENT DOCUMENTS

| | | | |
|---|---|---|---|
| 1,492,555 | 5/1924 | Cooper . | |
| 1,532,325 | 4/1925 | Lee | 156/214 X |
| 2,149,879 | 3/1939 | Mitchell | 264/87 X |
| 2,218,740 | 10/1940 | Burke | 156/297 X |
| 2,779,058 | 1/1957 | Hyde | 18/27 |
| 2,838,435 | 6/1958 | Hewett | 156/214 |
| 2,941,277 | 6/1960 | Ganz | 264/87 X |
| 3,179,725 | 4/1965 | Shultz et al. | 264/219 X |
| 3,215,763 | 11/1965 | Buerger | 156/212 X |
| 3,377,229 | 4/1968 | Bryan | 161/22 |
| 3,415,923 | 12/1968 | Petersen | 264/219 X |
| 3,651,855 | 3/1972 | Daussan | 264/87 X |
| 4,209,486 | 6/1980 | Ross | 264/245 |
| 4,472,339 | 9/1984 | van der Ploeg et al. | 264/219 |
| 4,496,511 | 1/1985 | Virgili | 264/219 X |
| 5,271,888 | 12/1993 | Sinsley | 264/87 |
| 5,393,479 | 2/1995 | Madeau | 264/219 |

FOREIGN PATENT DOCUMENTS

| | | | |
|---|---|---|---|
| 1184686 | 10/1985 | U.S.S.R. | 264/87 |
| 1315315 | 6/1987 | U.S.S.R. | 264/87 |
| 1380960 | 3/1988 | U.S.S.R. | 264/87 |

*Primary Examiner*—Karen Aftergut
*Attorney, Agent, or Firm*—Westman, Champlin & Kelly, P.A.

[57] ABSTRACT

A process for making a mineral fiber artificial log that can be used in vented and unvented gas fireplaces, fireplace inserts, and free-standing gas fire room heater to simulate the appearance of a real burning log. The process utilizes a screen mold formed from a pattern that can be made to give the desired exterior configuration and size for the formed log. The screen mold is placed in an outer porous jacket and then in a vacuum chamber. A slurry of the formulation containing mineral wool fibers, a suitable high temperature binder, and water is drawn into the mold while contained in the vacuum chamber, so liquid is drawn through the mold and mineral fibers are trapped in the mold. The log is formed to the size and shape of the mold. Once molded, the log is removed from the mold, dried in an oven, treated with a suitable rigidizing exterior coating, and again oven dried. The log is painted suitably, dried again, and packaged for sale.

11 Claims, 7 Drawing Sheets

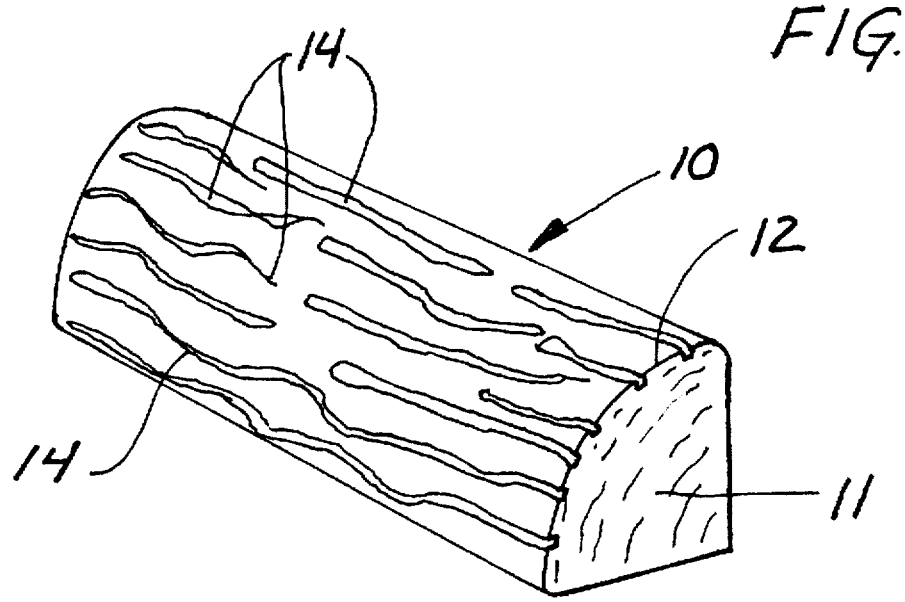
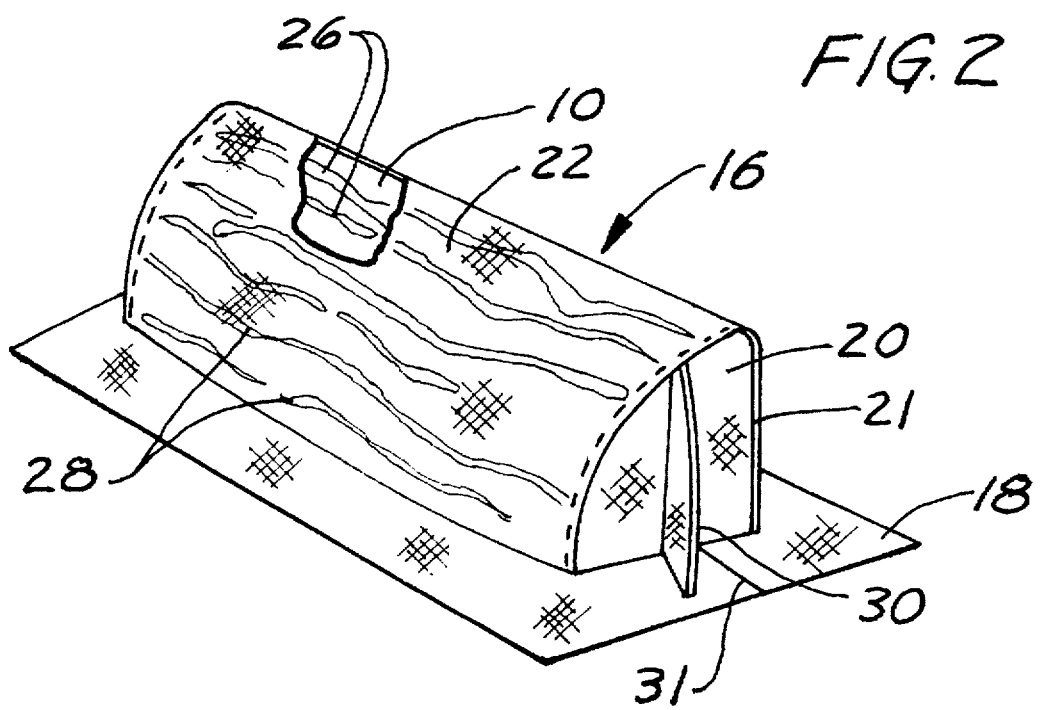

MINERAL FIBER LOG PROCESSING

BACKGROUND OF THE INVENTION

The present invention relates to a process of manufacturing an artificial log that can be used in connection with gas burners to give the appearance of a real log burning in a fireplace. The process utilizes a hand made pattern that is formed with the necessary configurations, after which a mold is formed around the pattern. A mineral fiber log is then molded in the formed mold by driving a slurry containing the solids needed to form the log into the mold in a vacuum chamber. The treatment of the material permits the use of mineral fibers even at the high temperatures of gas burners.

The desirability of using artificial logs for various types of gas and fuel burners has been known, and several types of logs have been advanced. U.S. Pat. No. 5,271,888 shows a ceramic log molding process, which uses ceramic fibers in a liquid composition in which the mold that is used is submerged in a tank that contains a liquid slurry and ceramic fiber slurry. A vacuum is applied to the mold to draw the material from the pool of liquid into the submerged mold through inlet ports. Because the mold is submerged the state of the log formation cannot be observed by an operator.

The present process provides a durable log that is made with mineral fibers that are quite large in diameter and thus less respirable than fine ceramic fibers previously used. Further, the method of making the pattern for forming the mold, along with inserts in the screen mold give a realistic appearance to the exterior of the log when finished.

SUMMARY OF THE INVENTION

The present invention relates to a process and formulation for manufacturing artificial logs used in connection with separate burners such as gas burners in unvented gas fireplaces, fireplace inserts, and free-standing gas fired room heaters. The log is composed of a suitable mineral wool fiber, which is relatively large in diameter, mixed in a slurry with an alumina binder for increasing the temperature of operation without deterioration of the mineral wool fibers.

In the process, a pattern is made from a block of wood or other carvable material that is shaped in the general configuration of a desired log size, and the pattern surface is treated by routing grooves simulating the location of recesses between bark ridges of bark on a tree. The routed pattern is made to provide a natural, eye pleasing pattern. Forming a pattern has been found to give a much more uniform, and desirable appearance than trying to select natural logs as patterns.

Once the log pattern is carved as desired, synthetic material (nylon) rope, or other similar fiber formed rope-like filler, is then placed into the grooves that have been formed in the pattern with surfaces of the filler at the periphery of the pattern. The size of rope or rope-like filler will vary depending on the size of the grooves that have been formed in the pattern and the lengths would be selected to fill the grooves.

After the nylon rope or other fiber rope-like filler (called nylon rope) has been placed into the grooves, a flexible mesh screen, such as a nylon screen, is cut to make a screen mold and is formed over the pattern with a suitable seam allowance so the individual wall sections are sewed together to fit the log pattern. Specifically, the ends of the screen mold at the ends of the logs are formed with a large fold or gusset of expansion material so that the ends of the screen mold can expand to permit side walls to be separated for removal after a synthetic or artificial fiber log has been formed in the mold.

The screen is formed over the pattern with an epoxy releasant so that the pattern can be removed with ease. After the screen has been formed over the log and rope lengths, a hot glue gun is used to apply adhesive to adhere the nylon rope lengths in the grooves to the inside of the screen mold while the screen is tightly held onto the log. The glue is applied from the exterior and passes through the screen openings to contact the nylon rope lengths to securely attach the nylon rope lengths to the screen.

The screen may be preformed on the pattern before the rope is placed in the grooves and then removed so that the nylon rope could be placed into the grooves. The screen pattern would then be replaced over the pattern for adhesively securing the rope lengths to the interior of the screen. Hot glue is fast and effective but other suitable adhesives can be used. The screen mold is made so it can be parted along the fold line of the end gussets to remove a finished log from the interior. The end folded material flaps permit separating the two mold parts.

A perforated rigid material or metal jacket or cover is formed to fit over the screen. The perforated rigid material jacket is preferably formed of sheet metal in two sections along a parting line so that it can be removed from the screen mold after forming a log. The two part, formed mold jacket is made by cutting pieces to sizes and welding or otherwise securing the pieces together. The rigid material jacket provides support for the screen mold during the vacuum molding process.

A vacuum chamber is formed to have a suitable recess for the mold assembly, and has slurry inlet tubes, that are open to the interior of the chamber. The mold assembly, including the interior screen mold and rigid material outer jacket, is formed to have one generally planar open side, and flanges are provided around the planar open side of the mold. The flanges will seal onto a surface provided in the vacuum chamber. The seal surrounds an opening that is covered with a screen layer that in turn closes the open side when the mold assembly is clamped in place. The mold is open to the inlet pipes through which the slurry is provided. When the rigid jacket mold is then clamped in place and the flange sealed, the vacuum chamber is closed. Vacuum is applied to the chamber and it will act to reduce the pressure surrounding the perforated rigid material jacket causing the slurry of water, mineral fiber and binder to be forced by air pressure to enter the vacuum chamber through the provided inlet tube or tubes. The water passes through the mold perforations and out the vacuum connection. The fibers and binder in the slurry are trapped by the screen inner mold. The slurry is moved into the mold until the mold is filled with the fibers and binder.

The liquid from the slurry, comprising primarily water, is held in a holding tank. The liquid is expressed from the mold and the formed log or other product, leaving only the fibers and the binder on the interior of the mold.

The vacuum chamber is then relieved of vacuum, opened, and the mold assembly is unclamped. Once the mold assembly and formed log are removed, the two sections of the rigid material mold jacket are unclamped, the screen mold separated carefully and the log is taken out for further processing, including drying, the addition of a rigidizing coating on the exterior, and subsequent painting steps. After the log has been processed to include painting, and the paint has been dried, it can then be wrapped, boxed and shipped. The screen used to close the open side of the mold remains in the vacuum chamber when the mold assembly is removed.

BRIEF DESCRIPTION OF THE DRAWINGS

FIG. 1 is a perspective schematic view of the typical pattern used for forming an artificial log made according to the present invention;

FIG. 2 is a view similar to FIG. 1 showing an inner screen mold being formed over the pattern;

DETAILED DESCRIPTION OF THE PREFERRED EMBODIMENTS

Figure 3:
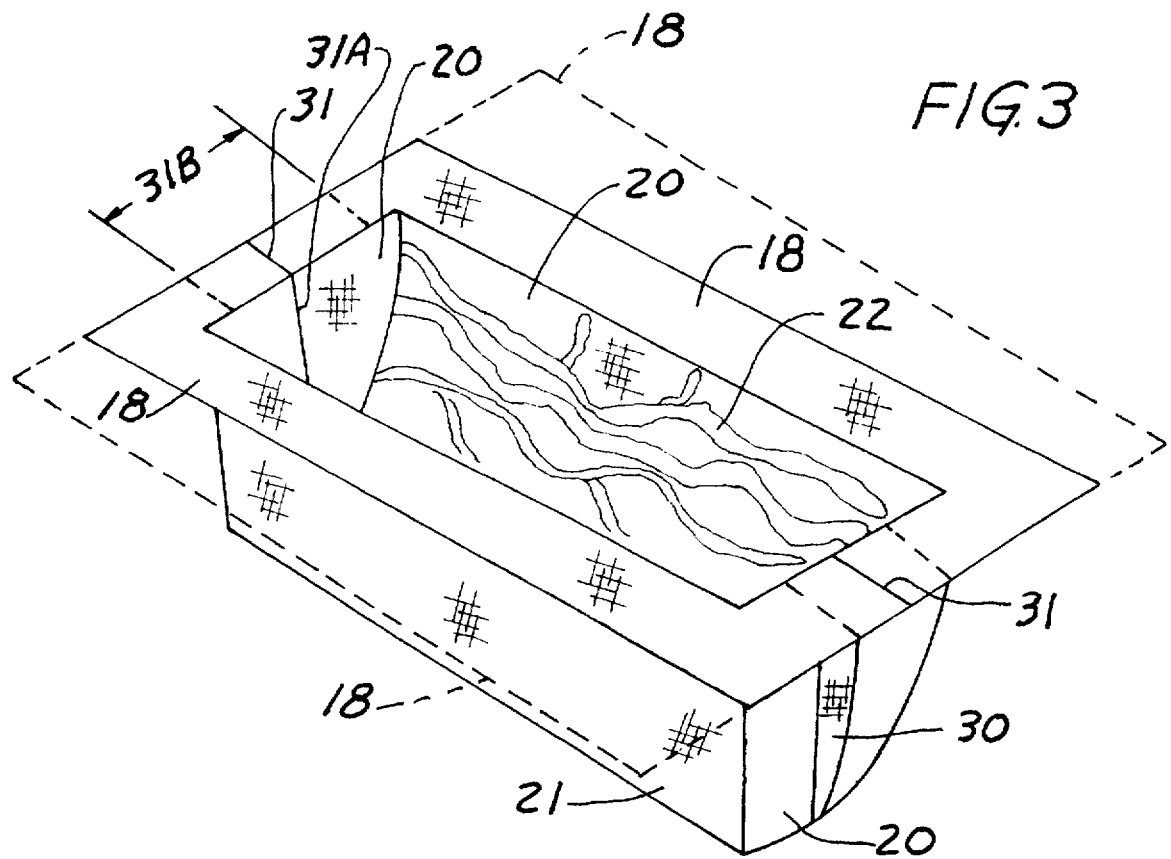
FIG. 3 is a perspective interior view of the screen inner mold of FIG. 2 illustrating the interior formations that will form grooves in the artificial log.

In the present invention and process, a synthetic log that is usable with an external burner such a gas fireplace burner, is made with mineral wool fibers, as opposed to ceramic fibers. Mineral wool fibers are generally believed to be less hazardous to the health, and are of larger size so they are less respirable. The mineral wool fibers are generally 60 microns in diameter or larger and are sold under the trademark Thermafiber FRF by USG. The mineral fibers are used with a binder, preferably Wesil M. W. Binder, manufactured by Wesbond Corporation, Willmington, Del., USA.

A first step in the process of forming synthetic logs specifically is illustrated in FIG. 1. In this step, a block of wood 10 is used to form a log pattern, by cutting it to a suitable cross sectional configuration, such as that shown by end 11, and then removing wood to form a desired curved periphery 12. Grooves 14 of different lengths, widths, and depths, are routed or carved into the surface of the pattern. The grooves are made irregular in length and width and are not straight to leave material between the grooves that simulates the configuration of bark. The grooves 14 form a negative pattern of bark.

This block of wood 10 thus will become a "carved log" that is a pattern for the ultimate artificial log that is to be formed. If products other than logs are to be molded patterns can be made as desired.

The next step of forming a mold for making an artificial log is illustrated in FIG. 2, where the mold that is to be used is formed as an inner screen mold 16 that includes a base peripheral flange 18 and suitable end panels or walls 20 as well as a side panel or wall 21 and a curved peripheral side panel or wall 22. The screen panels are usually a nylon screen that can all be stitched together along mating edges to fit closely to the pattern that is shown in FIG. 1 at 10. The screen mold can be formed and fitted over the pattern without filling material into the grooves 14. Prior to final forming, the preformed mold is removed from the pattern and the grooves 14 are filled with suitable size metallic or non metallic roping or filler member lengths 26 forming filler ribs. The roping or filler member 26 is selected to be suitable diameter and lengths to conform to the groove size and shape. Each of the grooves is filled with a length of roping. After the inner screen mold 16 has been formed around the pattern 10 in the general configuration, it is engaging the roping 26 forming raised ribs on the pattern, and a suitable adhesive, such as a hot melt glue, is applied from the exterior of the screen mold along the lines indicated at 28 to adhere the raised ribs formed by roping 26 to the interior of the screen in the same configuration and orientation as when the raised ribs formed by roping 26 were in the grooves 14 in the pattern 10. Nylon rope is satisfactory as roping, as is a soft metallic rope made from metal gauze, which is available commercially. The metallic roping forms ribs that leave rough looking edges on the bark of the formed log.

FIG. 3 is an inverted view of the inner screen mold 16 formed around the pattern 10, after being removed from the pattern 10. The flange 18 is a peripheral flange. As shown in both FIGS. 2 and 3, the ends 20 of the mold are provided with an extra fold or gusset of material 30 along a center line. The fold of material separates along a line 31 in the flange 18 at the opposite ends of the inner screen mold and along a junction line 31A where the fold will separate at the end panels 20. This extra fold of material permits expansion of two walls or sections of the screen mold along a parting line after a log has been formed. The dotted line shown in FIG. 3 illustrates the separation of the flanges 18 of the mold. The flanges separate along the parting line 31, and the fold 30 opens along line 31B to permit separation for removal of the molded log. The separation can be at least as indicated by the space 31B in FIG. 3 between the arrows shown. These folds or gussets of material can take any desired form, but generally would be just folded together on the pattern, as shown, so they are capable of being unfolded to open the screen mold.

The lengths of nylon rope 26 are illustrated in the FIG. 3 and they are glued to the inner surface of the screen inner mold. The ends of the rope length can be blended in to the screen easily.

Figure 4:
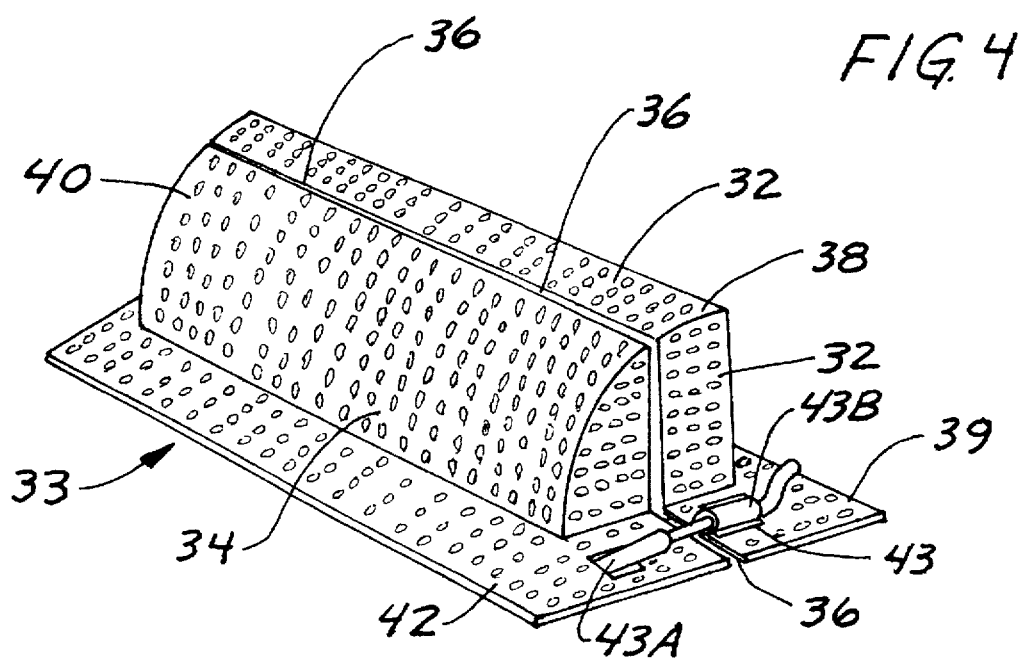
FIG. 4 is a perspective view of a rigid perforated outer mold jacket formed around the inner screen mold of FIG. 2.

A perforated rigid material mold jacket or cover 33 is illustrated in FIG. 4, and essentially it is formed to conform to the outer shape of the pattern 10 and inner screen mold 16 and to provide an outer jacket for the inner screen mold. The perforated rigid material mold jacket includes two separable sections indicated generally at 32 and 34, separable along a parting line 36. The section 32 includes the generally flat or planar side of the pattern, it includes a housing 38 conforming to a portion of the pattern 10 and inner screen mold, and a flange 39 that will overlie the flange 18 of the inner screen mold 16.

The perforated rigid material mold jacket section 34 has a partially curved wall 40 which conforms to the outer wall of the of the inner screen mold. The section 34 has end walls and a flange 42. The sections of flanges 39 and 42 at the ends of the perforated rigid material jacket 33 form mountings for clamps 43 of suitable design. The clamps 43 include a first section 43A fixed on the flange of jacket section mold 34, and an over center clamp housing 43B fixed on the flange 39 of the mold section 32. The clamp sections 43A and 43B are made so they do not fully disengage, but when loosened by lifting a lever let the mold sections move apart and release the molded part. The mold sections stay in an assembly joined by the clamps 43, which permit separation along the parting line of the mold sections. The clamp 43 also may be spring loaded in a suitable manner, which is well known, to hold the mold jacket sections together under a spring load but permitting the two mold sections 32 and 34 to expand slightly if necessary along the parting line 36 even though the clamps 43 (there is one clamp on each end) remain in their clamped position.

Figure 5:
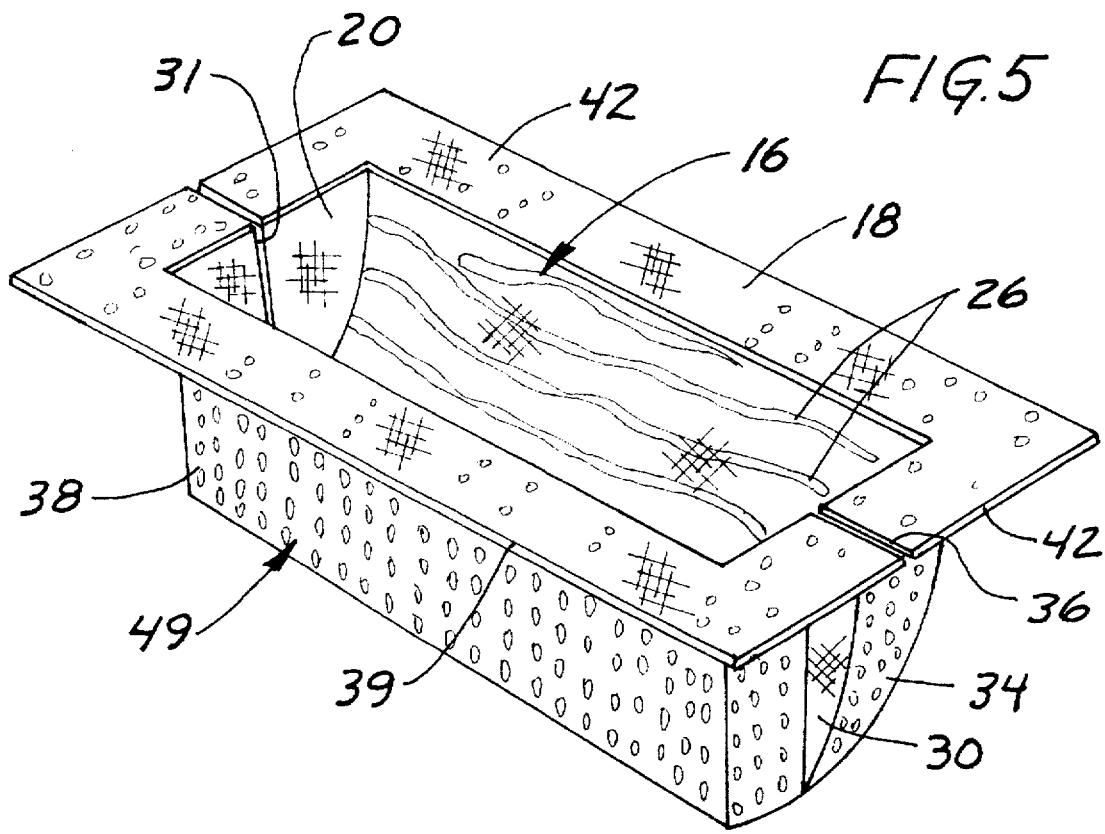
FIG. 5 is a perspective view of the interior of the rigid perforated mold jacket, with the inner screen mold shown on the interior thereof.

The perforated rigid material mold jacket 33, as shown is made preferably of a perforated, relatively thin metal, for example a sixteen gauge rolled steel sheet material that is perforated with ⅛" to ¼" diameter holes. Other perforation sizes and other materials can be used. FIG. 5 is a bottom side view of the mold jacket, with the screen mold 16 shown in place on the interior. The flanges 39 and 42 are illustrated, and the flange 18 of the inner screen mold is in registry with the flanges of the mold jacket 33.

Figure 6:
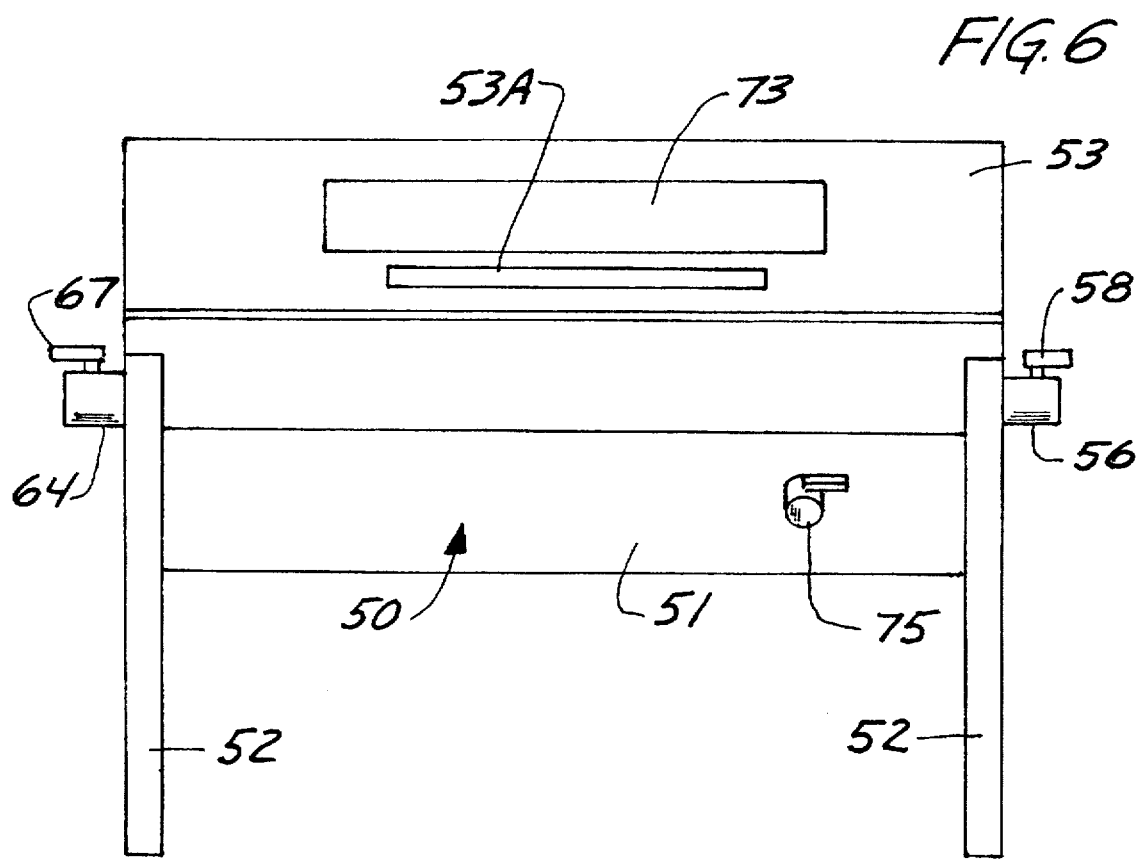
FIG. 6 is a side elevational view a typical vacuum chamber used with the present invention.
Figure 7:
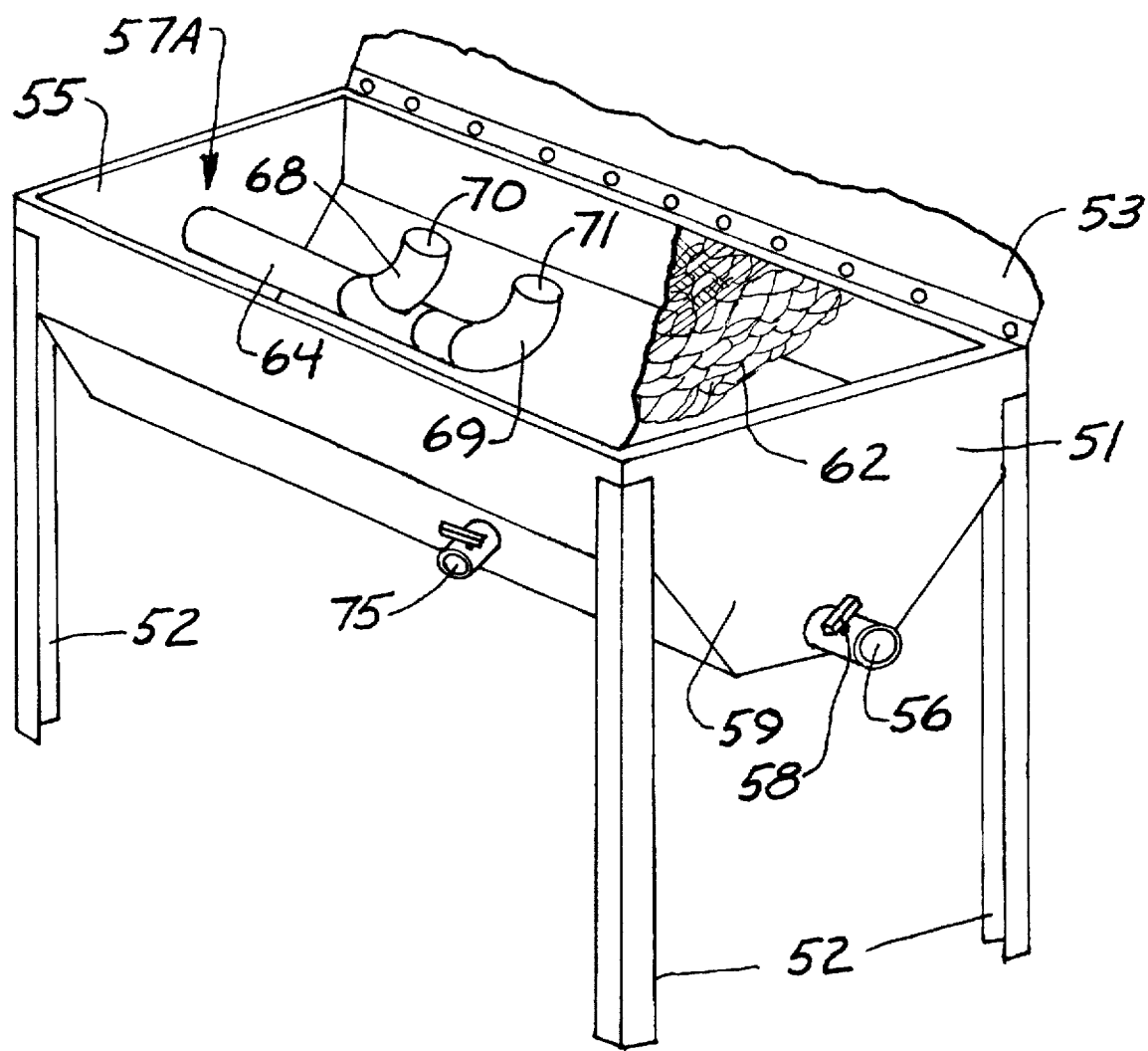
FIG. 7 is a perspective view showing the interior of the vacuum chamber, with parts in section and parts broken away.
Figure 8:
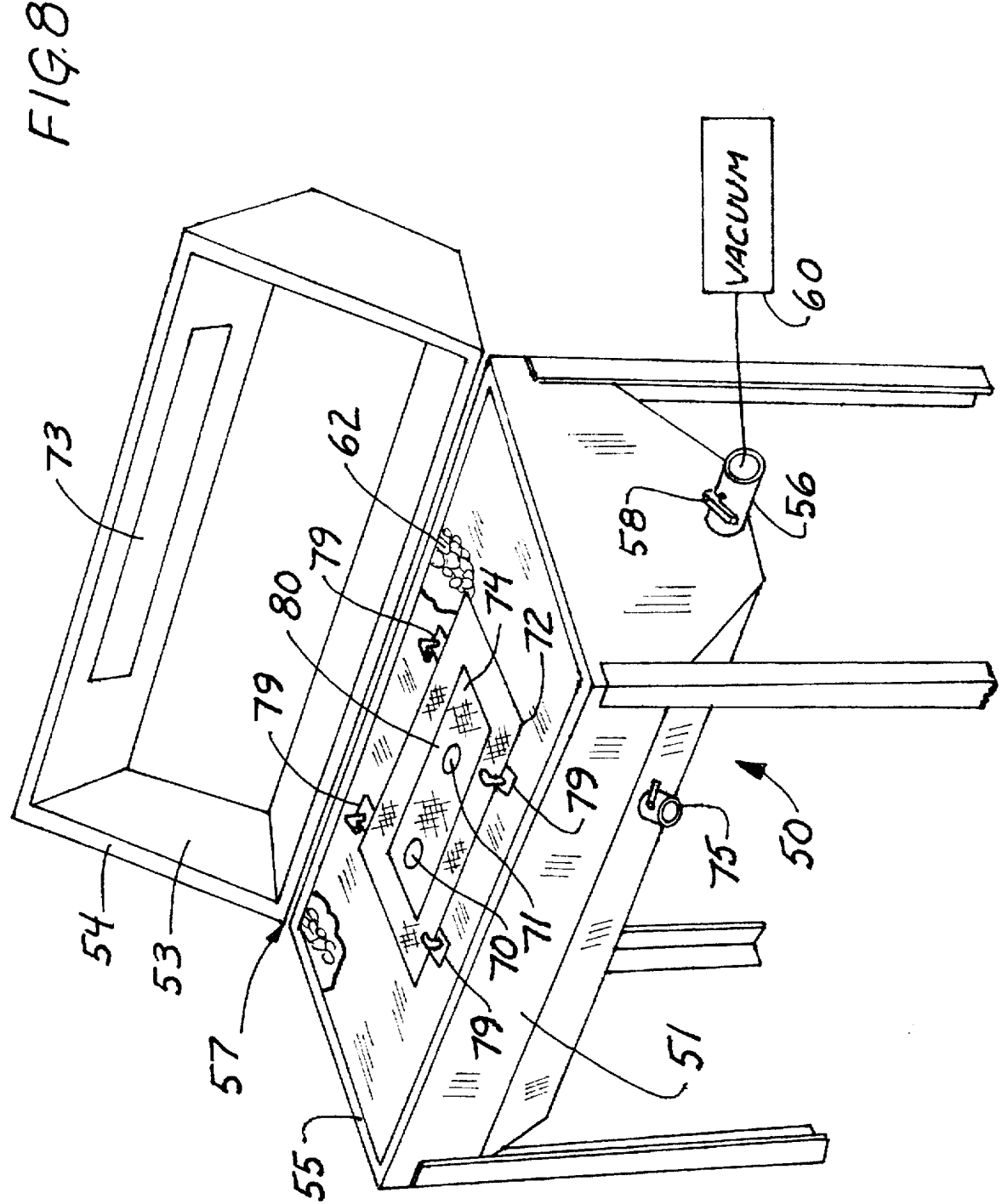
FIG. 8 is a perspective view similar to that shown in FIG. 7, with a mold seal plate in place showing the fiber slurry inlet ports extending through a mold bottom side screen.

The mold assembly 49, comprising the inner screen mold 16 and the perforated rigid material mold jacket 33 is processed in a vacuum chamber in a housing illustrated generally at 50 in FIGS. 6, 7 and 8. The vacuum chamber housing comprises a base compartment 51, supported on suitable legs 52, and having a sealable hinged cover 53 mounted thereon. The cover 53 has a sealing flange 54 around its periphery that mates with a flange 55 on the periphery of the compartment 51. The compartment 51 and cover 53 defined a vacuum chamber 57 that includes a lower section 57A in compartment 51. The cover has a lift handle 53A (FIG. 6) for opening and closing it.

Figure 9:
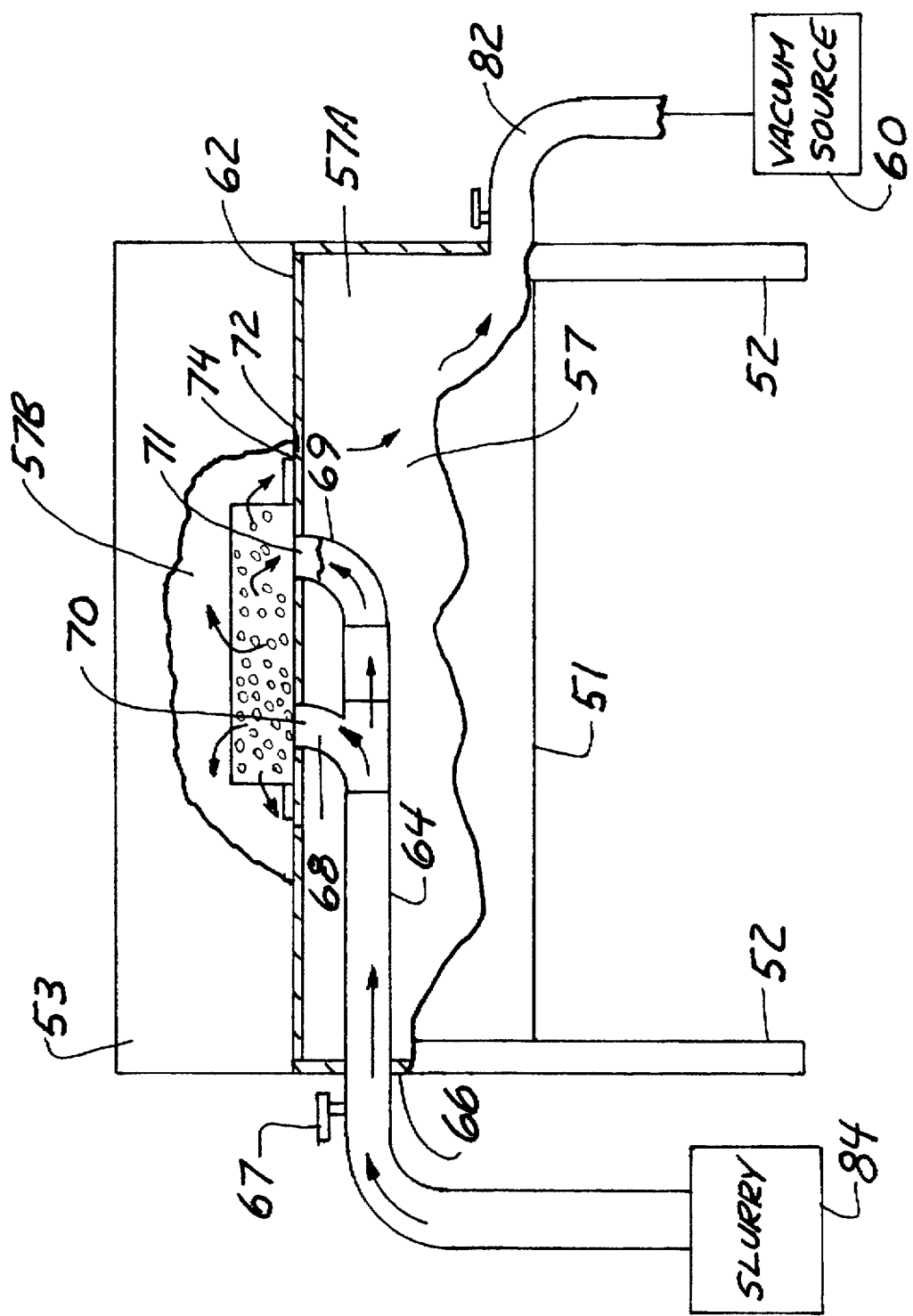
FIG. 9 is a schematic representation of the flow path of material into the mold and out through the perforations of the outer jacket.

The vacuum connection 56 is mounted on one end panel 59 of the compartment 51, and the connection includes an "on" and "off" valve 58. As will be shown, the vacuum connection 56 is in turn connected to a source of vacuum 60. The lower chamber 57A is defined at its top edge by an expanded metal grate 62 that has a central portion over which the mold assembly 49 is placed. The grate 62 divides the vacuum chamber 57 into sections 57A and 57B. A slurry inlet pipe 64 passes through an end wall 66 of the compartment 51, and it too has a valve 67 on the exterior of compartment 51 that can control flow through this pipe 64. One or more pipes can be used for providing slurry, and as shown in FIG. 9, the pipe 64 is branched off into two nozzles 68 and 69, which are formed as elbows and form upwardly facing ports 70 and 71. These ports, formed by the nozzles, are supported on the expanded metal grate 62. The pipes pass through provided openings in the grate 62 with the parameter of an open center seal plate 72 that is also supported on the grate 62. The outer edges of the ends of the pipes are sealed to and open through a bottom screen layer 74 that is supported on grate 62 and lies on top of the peripheral seal plate as shown in FIG. 8. The outer periphery of seal plate 72 is of substantially the same size as the outer edges of the flanges 18 and the flanges 39 and 42 of the perforated rigid material mold jacket 33.

Screen layer 74 forms a bottom for the inner screen mold. The mold assembly 49 is sealed around its flange onto the seal plate 72 so the ports 70 and 71 are within a sealed area. The ports open into the mold interior and are sealed around their peripheries to the mold bottom formed by screen layer 74. When the vacuum is applied and the slurry is drawn through the pipe 64, the slurry will fill the mold and will not be discharged into either the chamber 57A and 57B until after passing through the screen bottom or the mold assembly perforations.

It should be noted that the cover 53 can have a viewing port 73, if desired so that an operator can observe the molding process carried on in the interior of the vacuum chamber. This view port 53 allows the operator to observe when the molding process is complete, based on the absence of slurry passing through the mold. The logs will have proper density but unneeded or excess time of applying vacuums is eliminated, so the process is speeded up without losing quality.

With both the seal plate 72 and the screen plate 74 in place on the expanded metal divider 62, and with the ports 70 and 71 sealed relative to the screen plate 74, the rigid mold assembly 49 shown in FIG. 5 is then placed onto the seal plate 74 and is latched in place with suitable latches 79 shown schematically in FIG. 8. The latches 79 can be overcenter type clamps, screw type clamps or strong spring loaded clamps that will force the flanges 39 and 42 tightly down onto the flange 18, screen plate 74 and seal plate 72. The seal plate is a peripheral band that leaves an open center area indicated at 80, which is covered by the screen layer. Slurry entering the mold can also pass downwardly through screen layer 14 to ensure that the mold is filled completely. The expanded metal grate 62 supports the screen layer 74 in the center area 80.

The flanges 39 and 42 will be coated with a suitable flexible sealant, to ensure a tight vacuum holding seal between the seal plate 74 and the flanges 39 and 42.

Once the perforated rigid material mold jacket and the inner screen mold assembly has been fastened in place in the vacuum chamber and sealed relative to the seal plate, and the cover 53 closed and sealed in a suitable manner, vacuum can be provided to the entire vacuum chamber 57. This is done by opening the valve 58, and energizing the vacuum source through connections that will be explained, to draw a slurry from a slurry supply indicated generally at 84 through the pipe 64 and pipe nozzles 68 and 69, and out through ports 70 and 71 into the interior of the mold assembly 49. This flow of slurry is illustrated in FIG. 9 by arrows, to show that there will be a flow a material coming into the mold.

Excess liquid that comes out through the screen and through the perforations on the perforated rigid inner material mold jacket will be drawn off through the line 82 as well, and when the interior of the mold assembly is filled with fiber and has been subjected to vacuum to reduce the moisture content to a desired level, the log or other product will be completely formed with the configuration that is defined by the interior of the inner screen mold.

After that, the vacuum will be released either by releasing the valve 75, or some other suitable way, the cover 53 opened, the mold assembly 49 released and the assembly and formed log removed from the seal plate 72 and the screen bottom 74.

The log will be removed from the mold by opening the clamps 43, removing the perforated rigid material outer jacket, and separating the parts of the inner screen mold as shown in FIG. 3 to permit removing the formed log. The log will then be further processed, generally as shown in FIG. 10.

The material for the slurry will be selected to be a desired composition for a non-combustible molded log including a formulation of water, mineral wool fibers, and Wesil M. W.-alumina binder. The Wesil M. W.-alumina is formulated for use with mineral wool fibers and is a formulation containing colloidal alumina which will effectively impregnate the mineral wool fibers to bind them and to increase the temperature of use up to in the range of 1600° F. without deterioration of the fiber material.

For 100 gallons of water, mineral wool fibers in the range of about 10 lbs with alumina binder in the range of about 7 lbs will be mixed together to form a slurry. The mineral wool content can be varied as desired, but the ratio of 7 pounds of binder to 10 pounds of mineral wool fiber is preferred and the binder can be between 6 and 8 pounds for every 10 pounds of mineral wool fiber. The amount of water is selected to ensure that the resulting slurry can be moved through the pipes provided under the vacuum in the vacuum chamber 57.

Figure 10:
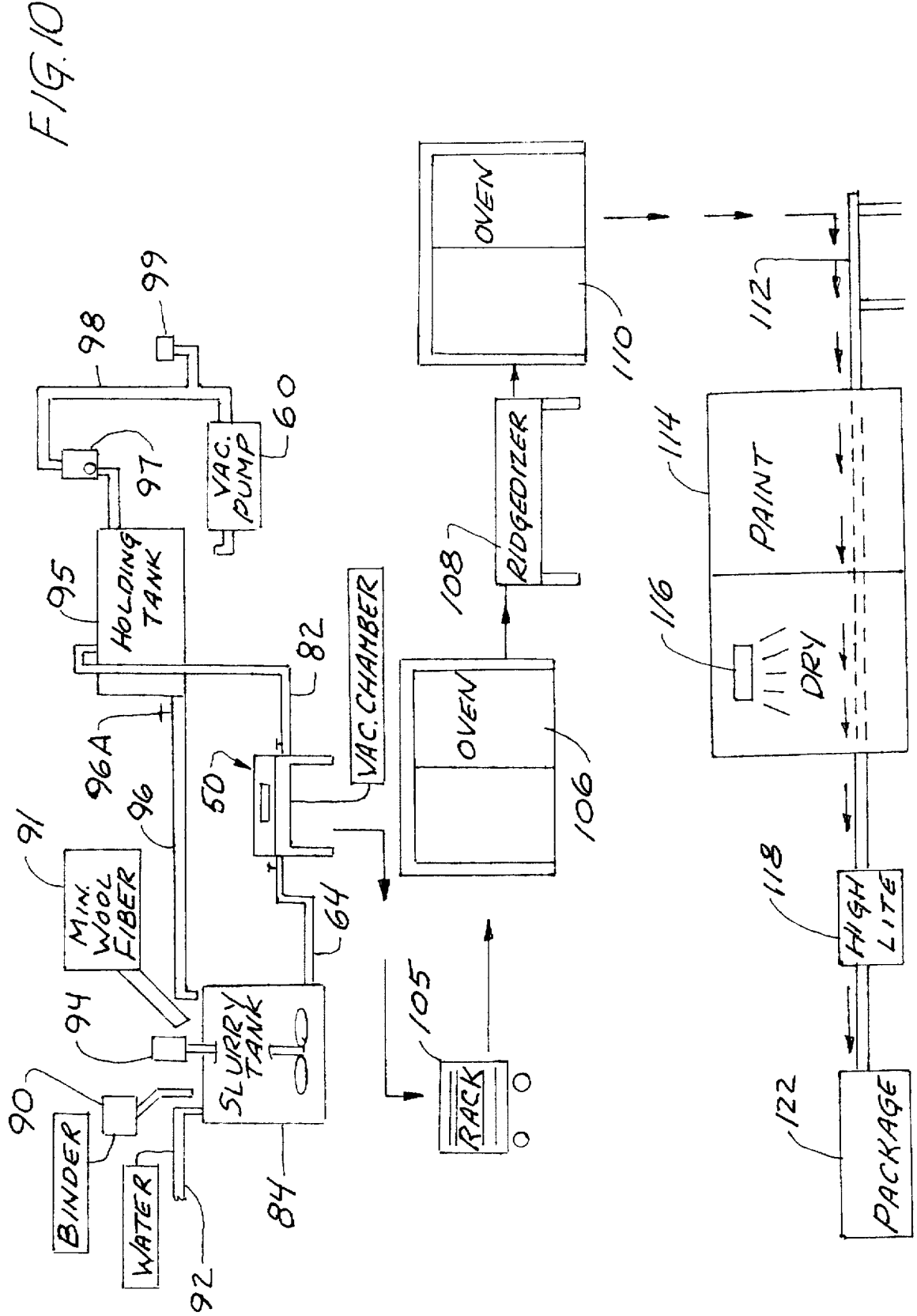
FIG. 10 is schematic flow chart representation of the method of the present invention.

Referring to FIG. 10 which is a simplified flow diagram of the process, the binder (alumina) comes from a source of supply 90, as do the mineral wool fibers shown from the source 91. A water supply 92 is provided, and the slurry is mixed in a slurry tank 84 with a suitable mixer indicated generally at 94. The slurry tank 84 also will receive return liquid from a holding tank shown at 95 which receives the excess water from the vacuum chamber 57. Return liquid is provided through a pipe 96.

Vacuum chamber housing 50 is shown connected with the line or pipe 64 from the slurry tank or source of slurry 84. The outlet line 82 comes from the source of vacuum comprising a vacuum pump shown at 60 in FIG. 10. This source of vacuum is connected through the holding tank 95, which is sealed to carry vacuum, and the lines or pipes connected to the tank 95 are also sealed so that they will carry the vacuum provided. The vacuum pump connects through a check valve 97 to the holding tank, and through a suitable line 98. A relief valve 99 can also be provided if desired to avoid excessive vacuum from being supplied. In the range of 15 inches of mercury has been found to be sufficient vacuum or negative pressure to cause the fiber containing slurry to move into the mold assembly where the fibers and binder become trapped.

Again, the excess liquid material that is drawn out through the line 82, and through the mold assembly is retained in the holding tank 95. The holding tank can be emptied periodically by opening a suitable valve shown in 96A when additional material is being added to the slurry tank 84.

When the logs have been molded in the housing 50 as described, they are removed and stored in a rack 105 for initial drying and then are placed in an oven 106 for drying. It should be noted that the clamps on the perforated rigid material mold jackets are released so that the inner screen mold is released. Then the expansion folds of material on the inner screen mold are used for separating the mold walls from the formed log.

The oven 106 preferably is set at about 300° F., and it is used for drying the logs for a desirable length of time.

The logs dried in the oven 106 are then put into a rigidizer tank 108 where the logs are submerged in a material comprising a mixture of water and NALCOAG 1050, which is a colloidal silicone mixture available commercially and which will adhere to the outer surface of the logs. The rigidizer mixture, once dried, gives the exterior of the formed log a very hard surface and allows the log to be handled without chipping, breaking or other deterioration.

From the rigidizer tank 108, the logs with the wet colloidal silicone layer, are passed through a second oven 110 and the logs are dried at a suitable temperature for a length of time, for example 3 to 4 hours at 300° F.

The logs then are put onto a conveyer line shown at 112, passed through a suitable painting booth or assembly 114, a paint drier 116 and then they can go to a station 118 where suitable painted on "highlights" can be applied to make the appearance as desired. Then, the logs are packaged and shipped at a packaging station 122.

In summary, the process is basically commenced with the unique way of forming the pattern for the mold, as well as making the mold itself, and having the open bottom perforated rigid mold cover and an inner screen mold assembly that is placed into a vacuum chamber where the slurry containing the mineral fibers and binder is drawn into the mold by a vacuum, causing a flow through the mold and out of the vacuum chamber. This is quite different from immersion techniques for molding logs that have previously been utilized, which require protective clothing, and working in the liquid slurry, including ceramic fibers and alumina. The present process is much cleaner, less likely to cause environmental hazards and there is less likelihood of slipping because the operators can remain in a dry environment. A highly useable, durable, and attractive log is formed.

The molds can be for any desired product and the vacuum forming steps will work satisfactorily. The process maintains a dry environment for the operator.

The terms roping and "ribs" is intended to cover various rope and rope like fillers that can be used to form ribs on the interior of the screen mold, including hand formed elongated flexible lengths formed from materials compatible with the molding process.

Although the present invention has been described with reference to preferred embodiments, workers skilled in the art will recognize that changes may be made in form and detail without departing from the spirit and scope of the invention.

What is claimed is:

1. A method of forming a mold comprising a three dimensional pattern for a simulated fireplace log, comprising the steps of:

forming an exterior configuration of a block of material to a general shape of the simulated fireplace log;

forming elongated grooves in a surface of the block of material;

filling the elongated grooves with elongated ribs formed of desired sizes and extending outwardly from the block of material; and placing a layer of mold forming material over the block of material to form the mold by causing the elongated ribs to adhere to the mold forming material as the mold forming material is removed from the block of material thereby allowing elongated grooves to be formed in a molded simulated fireplace log formed in the mold corresponding to the elongated grooves formed in the block of material.

2. The method of claim 1 wherein the ribs comprise roping of different sizes selected to fill the grooves formed in the pattern.

3. The method of claim 1 wherein the mold forming material is a screen and a screen mold is formed with an open side, and the method is for forming a molded simulated fireplace log comprising the further steps of providing a perforated support jacket over the screen mold generally conforming to an exterior of the screen mold, placing the jacket and screen mold in a vacuum chamber over a screen layer which forms a cover on the open side of the screen mold and which is part of the screen mold, providing an inlet port to an interior of the screen mold while preventing flow of material from the port to the vacuum chamber except through the screen mold and the perforated support jacket, and providing a vacuum in the vacuum chamber on an exterior of the jacket to draw in a slurry of material from which the molded simulated fireplace log is to be formed through the port, the slurry containing solids and a liquid, and portions of the slurry being drawn through the screen mold and jacket to leave solids in the screen mold until the molded simulated fireplace log is formed.

4. The method of claim 3 including the further step of forming the screen mold to have at least two side walls formed over the block of material, and the one open side which comprises a bottom side, the screen mold having end panels formed with gussets folded in the end panels to permit the end panels to expand as the side walls are separated, thereby providing access to the interior of the screen mold through the open side for removal of the molded simulated fireplace log.

5. The method of claim 3 including the further step of releasing the vacuum from the vacuum chamber after the simulated fireplace log is formed, removing the jacket and screen mold from the vacuum chamber, and opening the jacket and the screen mold to remove the molded simulated fireplace log.

6. The method of claim 5 including the step of applying a rigidizing coating to an exterior of the simulated fireplace log.

7. A method for forming a three dimensional solid molded part comprising the steps of:

forming a pattern having a shape and surface configuration desired for the molded part;

forming a screen mold over the pattern to conform to the desired surface configuration;

providing a perforated support jacket over the screen mold generally conforming to an exterior of the screen mold;

placing the jacket and screen mold in a vacuum chamber over a layer of material to form a cover for an open side of the screen mold;

providing an inlet port to an interior of the screen mold above the layer of material;

sealing around a periphery of the screen mold which surrounds the inlet port; and providing a vacuum in the vacuum chamber on an exterior of the jacket to draw in a slurry of material comprising a liquid and solids through the inlet port, and to draw liquid through the screen mold and perforated support jacket to leave solids on an interior of the screen mold to form the molded part.

8. The method of claim 7 including the step of forming the jacket and screen mold in separable parts to permit removal of the molded part therefrom.

9. The method of claim 8 wherein the step of sealing comprises providing a seal plate in the vacuum chamber, the seal plate forming a peripheral flange around the inlet port.

10. The method of claim 7 including the step of observing passage of liquid from the slurry through the perforated support jacket and discontinuing providing vacuum when the passage of liquid therethrough diminishes by a desired amount.

11. A method of forming a three dimensional mold for forming a solid molded part comprising the steps of:

forming a pattern by forming an exterior configuration of a block of material to a general shape of a desired molded part;

forming grooves in a surface of the pattern;

filling the grooves with elongated ribs formed of desired sizes for causing grooves to be formed in the molded part corresponding to the grooves in the pattern;

forming a screen mold over the pattern and the ribs;

adhering the ribs to the screen mold from an exterior of the screen mold; and removing the screen mold from the pattern with the ribs adhering to an interior of the screen mold.

* * * * *